US009841815B2

(12) United States Patent
Clausen

(10) Patent No.: US 9,841,815 B2
(45) Date of Patent: Dec. 12, 2017

(54) METHOD FOR DIFFERENTIATION OF TOUCH INPUT AND VISUALIZATION OF PENDING TOUCH INPUT

(71) Applicant: Samsung Electronics Co. Ltd., Suwon-si, Gyeonggi-do (KR)

(72) Inventor: William Stryker Clausen, Kirkland, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 190 days.

(21) Appl. No.: 14/021,372

(22) Filed: Sep. 9, 2013

(65) Prior Publication Data
US 2015/0070284 A1    Mar. 12, 2015

(51) Int. Cl.
G06F 3/041    (2006.01)
G06F 3/045    (2006.01)
G06F 3/01    (2006.01)
G06F 3/0488    (2013.01)

(52) U.S. Cl.
CPC .............. G06F 3/014 (2013.01); G06F 3/015 (2013.01); G06F 3/0416 (2013.01); G06F 3/04883 (2013.01); G06F 2203/04101 (2013.01); G06F 2203/04104 (2013.01); G06F 2203/04808 (2013.01)

(58) Field of Classification Search
CPC . G06T 19/006; G06F 3/0482; G06F 3/04842; G06F 3/017
See application file for complete search history.

(56) References Cited

U.S. PATENT DOCUMENTS

| 2005/0275635 | A1* | 12/2005 | Dehlin et al. | 345/173 |
| 2006/0190836 | A1* | 8/2006 | Ling Su et al. | 715/773 |
| 2007/0178950 | A1* | 8/2007 | Lewis | H04B 1/385 455/575.6 |
| 2009/0309848 | A1* | 12/2009 | Terada et al. | 345/173 |
| 2009/0315848 | A1* | 12/2009 | Ku | G06F 3/0416 345/173 |
| 2010/0090982 | A1* | 4/2010 | Oba et al. | 345/174 |
| 2011/0126097 | A1* | 5/2011 | Isono | 715/702 |
| 2011/0210928 | A1* | 9/2011 | Matsuda | 345/173 |
| 2014/0240103 | A1* | 8/2014 | Lake | G08C 17/02 340/12.5 |

FOREIGN PATENT DOCUMENTS

WO    WO 2009067224 A1 *    5/2009    ........... G06F 3/0416

* cited by examiner

*Primary Examiner* — Alexander Eisen
*Assistant Examiner* — Nan-Ying Yang
(74) *Attorney, Agent, or Firm* — Jefferson IP Law, LLP

(57) ABSTRACT

An apparatus and method for differentiation of a touch input in a touch sensitive device are provided. The method includes extending an object of a plurality of objects, each of the plurality of objects having a different corresponding identity, determining an identity of the extended object, communicating the identity of the extended object to the touch sensitive device, and, when the object touches the touch sensitive device, performing a function of the touch sensitive device according to the identity of the extended object.

37 Claims, 10 Drawing Sheets

METHOD FOR DIFFERENTIATION OF TOUCH INPUT AND VISUALIZATION OF PENDING TOUCH INPUT

TECHNICAL FIELD

The present disclosure relates to an apparatus and method for touch input in a touch sensitive device. More particularly, the present disclosure relates to an apparatus and method for differentiation of touch input and visualization of pending touch input in a touch sensitive device.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Mobile terminals now are commonly available with touch sensitive screens. The touch sensitive screens can accept a user's touch as an input, and determine an appropriate function to execute in response to the touch input according to the location of the touch input.

However, it is an inconvenience to users that the related art does not reveal the function to be executed prior to the touch input. For example, if a user is playing a game and taps on the game character's weapon, the user might be expecting the character to fire the weapon. However, the game might be programmed such that the weapon is fired by tapping a target, and tapping on the weapon may cause the game character to holster the weapon so as to free the hands for other tasks. Thus, the user may not be aware that the function of a particular input is undesired until after the input is entered.

Further, it has been a limitation in the related art that inputs can relate to functions only by the input itself, and not according to various possible objects the user might employ to touch the screen. For example, a user using an application with complex input possibilities, such as a game, may be required to change a state of the game in order to enable a desired input. However, if the user could have inputs of different objects, for example, different fingers, identified and thus procure different responses, it would greatly convenience the user by multiplying the possible inputs and resulting functions by the number of differentiable inputs, for example, multiple fingers.

Accordingly, there is a need for an apparatus and method for providing differentiated touch inputs to a touch sensitive mobile device. Further, there is a need for an apparatus and method indicating a function of a touch input of a touch sensitive mobile device.

SUMMARY

Aspects of the present disclosure are to address at least the above-mentioned problems and/or disadvantages and to provide at least the advantages described below. Accordingly, an aspect of the present disclosure is to provide an apparatus and method for differentiation of a touch input in a touch sensitive device, and for indicating a function of a touch input of a touch sensitive device.

In accordance with an aspect of the present disclosure, a method for differentiation of a touch input in a touch sensitive device is provided. The method includes extending an object of a plurality of objects, each of the plurality of objects having a different corresponding identity, determining an identity of the extended object communicating the identity of the extended object to the touch sensitive device, and, when the object touches the touch sensitive device, performing a function of the touch sensitive device according to the identity of the extended object.

In accordance with another aspect of the present disclosure, a method for indicating a function of a touch input of a touch sensitive device is provided. The method includes bringing an object within a threshold distance of the touch sensitive device, detecting the object, determining a location on the touch sensitive device closest to the object, determining a function to be executed according to at least the determined location, and indicating the determined function.

In accordance with yet another aspect of the present disclosure, an apparatus for differentiation of a touch input in a touch sensitive device is provided. The apparatus includes a touch sensitive input, a wireless communication unit configured to receive an identity of an object of a plurality of objects, and at least one processor configured to execute a plurality of functions, at least one of the functions corresponding to the identity of the object, and to execute the at least one function according to the identity of the object when a touch is sensed on the touch sensitive input.

In accordance with still another aspect of the present disclosure, an apparatus for indicating a function of a touch input of a touch sensitive device is provided. The apparatus includes a touch sensitive input, a proximity sensor configured to detect an object which is within a threshold distance of the touch sensitive input, and at least one processor configured to determine a function to be executed according to at least a location on the touch sensitive input which is closest to the detected object, and to output an indication of the determined function when the proximity sensor detects that the object is within the threshold distance.

In accordance with yet still another aspect of the present disclosure, a method of indicating a function of a touch input of a touch sensitive device is provided. The method includes bringing an object within a threshold distance of the touch sensitive device, detecting the object, determining an identity of the object, determining a location on the touch sensitive device closest to the object, determining a function to be executed according to at least the location and the identity, and indicating the determined function.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Various embodiments of the present disclosure include an apparatus and method for differentiating a touch input in a touch sensitive device.

Figure 1:
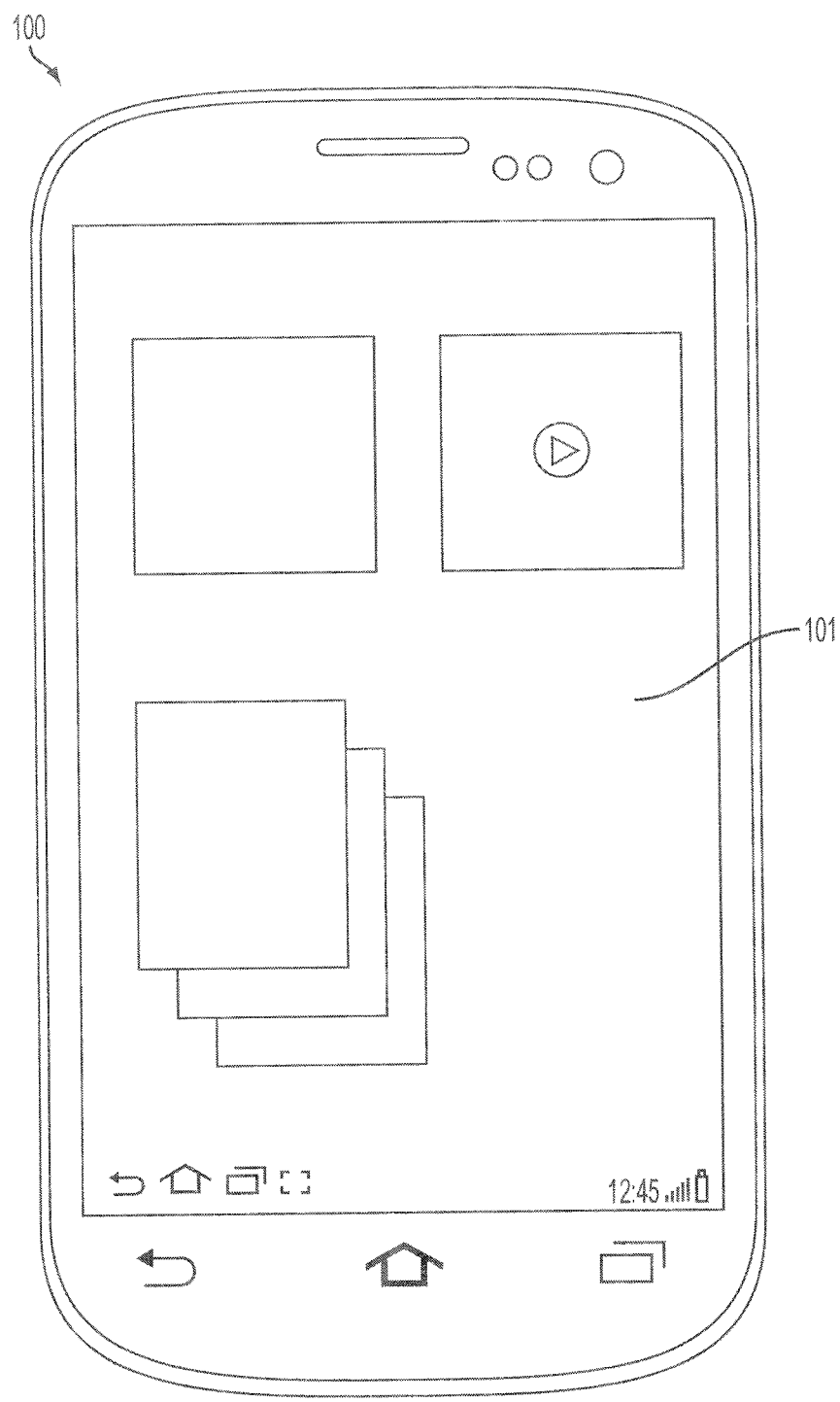
FIG. 1 is a touch sensitive mobile device according to an embodiment of the present disclosure.

FIG. 1 is a touch sensitive mobile device according to an embodiment of the present disclosure.

A mobile device 100 is a touch-sensitive device, such as a tablet computer. The mobile device 100 incorporates a touch screen 101 that is proximity sensitive. That is, the touch screen 101 is capable of detecting when a touch of an object to the screen is proximate, prior to the object actually touching the screen.

Figure 2A:
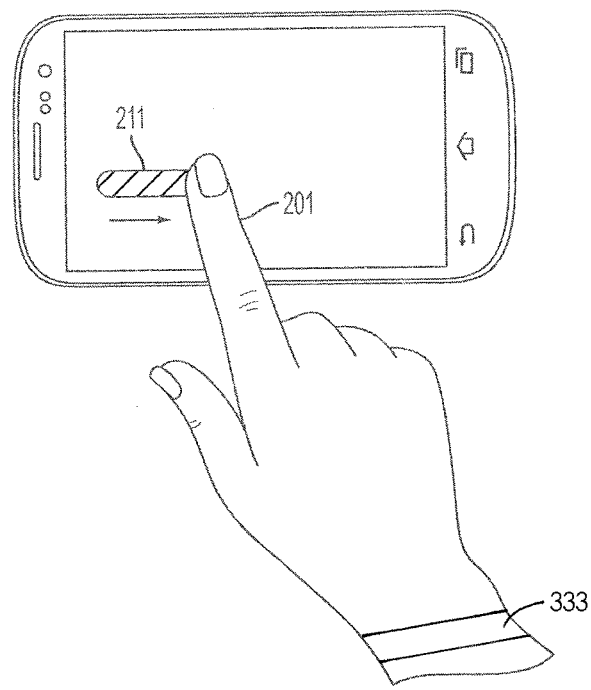
FIGS. 2A and 2B illustrate a method of differentiating a touch input according to an embodiment of the present disclosure.
Figure 2B:
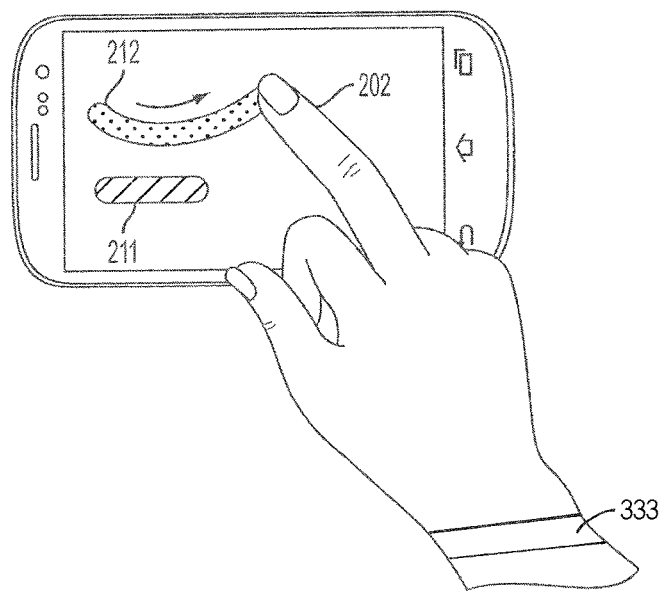

FIGS. 2A and 2B illustrate a method of differentiating a touch input according to an embodiment of the present disclosure.

Referring to FIG. 2A, a user of a touch sensitive device is using an application on the device that differentiates among touch inputs. For example, the user may be using an application for drawing graphic illustrations. The user has extended a first object, for example, an index finger 201 to input to the touch screen. The device may be configured, for example, to execute a function according to the identity of the input finger. In this example, the device is configured to draw a thick dark line if it determines that the touch input is by the index finger. Thus, the user has drawn index finger 201 from left to right to create a thick dark line 211.

Referring to FIG. 2B, the user wishes to draw in a different effect. The user retracts the index finger 201 and extends the middle finger 202. The device may be configured to draw a thinner, lighter line if it determines that the input is by the middle finger. In FIG. 2B the user draws the middle finger 202 in a curved motion on the touch screen to create a thin, light line 212.

The user does not need to select a different color or line thickness between the two drawing inputs. Instead, the device is able to determine which finger is used, and to determine what function is associated with each finger.

Figure 3:
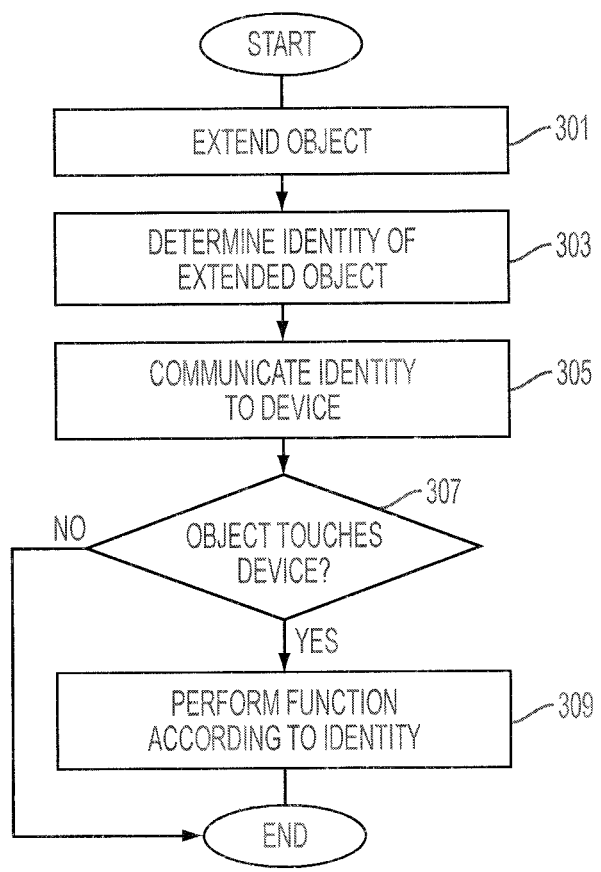
FIG. 3 is a flowchart of the method of FIGS. 2A and 2B.

FIG. 3 is a flowchart of the method of FIGS. 2A and 2B.

Referring to FIG. 3, in operation 301, an object is extended. For example, a user may extend a particular finger as the object.

In operation 303, the identity of the extended object is determined. This may be accomplished by various embodiments discussed below.

In operation 305, the identity of the object is communicated to the device. This may be accomplished by various methods discussed below.

If the identified object touches the device in operation 307, then the device performs a function in operation 309 according to the identity of the object.

Various methods may be employed to determine which object, for example, a finger, is extended, and to communicate that identity to the device.

In one embodiment, the user wears a myoelectric sensor 333. The myoelectric sensor 333 may be worn as a band on the forearm, for example, as illustrated in FIGS. 2A and 2B, and may detect the contraction of muscles in the forearm to determine motions of the hand and fingers. Thus, the sensors in the band may detect that the index finger is extended and the other fingers are retracted. The band may then communicate this identified finger to the device through wired or wireless communications, for example Bluetooth.

In another embodiment, the sensor may be configured to be worn on the wrist and detect the movements of the hand and fingers according to tendons in the front and back of the wrist.

In another embodiment, the sensor may be configured in the form of a glove and detect movements of the glove. The sensor may thereby infer movements of the different fingers.

The present disclosure is not limited thereto. For example, a user who has frequent need of such a sensor and who cannot risk forgetting it, or who wishes to conceal its presence, may have a sensor implanted under the skin on a long term basis.

In another embodiment, individual devices are located on each finger to be differentiated. For example, a micro device may be attached to each finger behind the nail. For another example, a micro device may be mounted on each fingernail. The micro devices may each communicate with the touch sensitive device. The touch sensitive device may detect and communicate with a micro electric device directly to identify it. Alternatively, the touch sensitive device may detect multiple micro devices and determine which finger is the input finger according to which micro device has the strongest signal. Alternatively, the touch sensitive device may determine which finger is the input finger according to which micro device is determined to be closest to the touch input location.

Note that it is not necessary that the sensor be directly connected to the object used for the touch input. For example, a user may have one or more foot pedals that can be tapped to indicate which finger identity is intended. Alternatively, a sensor may be mounted on the user's body or leg, for example, such that movements independent of the hand and fingers determine and indicate which finger identity is intended. With this embodiment, a user who is disabled to various degrees, for example, a user who does not have full use of five fingers, may still enjoy a variety of input possibilities.

Figure 4A:
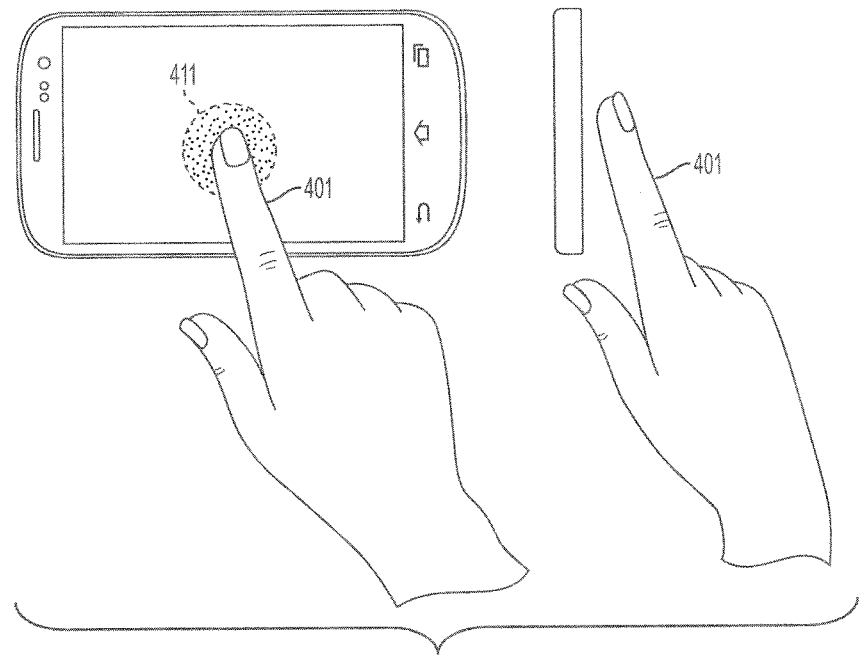
FIGS. 4A and 4B illustrate a method of indicating a function of a touch input according to various embodiments of the present disclosure.
Figure 4B:
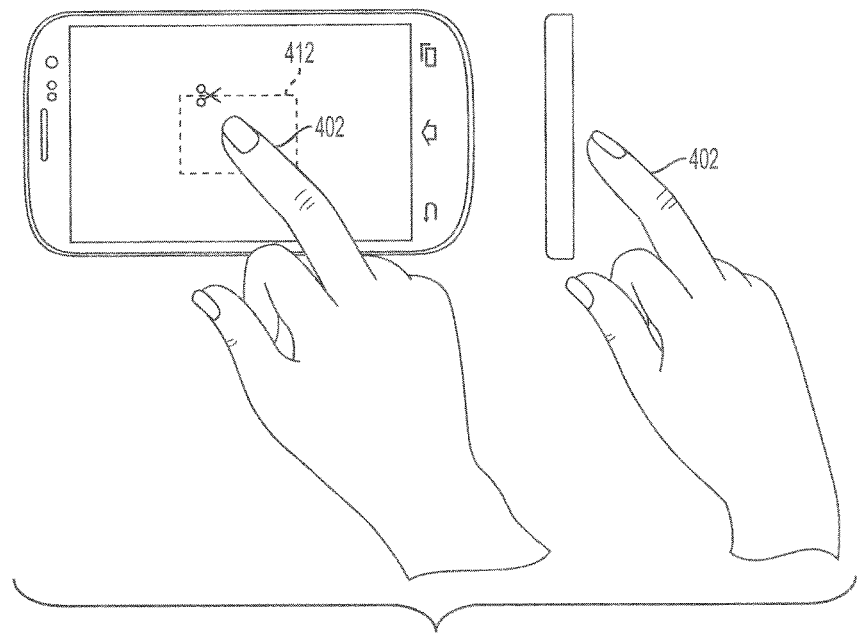

FIGS. 4A and 4B illustrate a method of indicating a function of a touch input according to various embodiments of the present disclosure.

Referring to FIG. 4A, two views are shown of a user extending an index finger 401 towards a touch sensitive device. For simplicity of understanding, the example of a graphics drawing program is used again. In FIG. 4A, as the index finger 401 nears the touch screen, the finger 401 is identified and an indication 411 of a corresponding function is indicated. For example, the device may be configured to respond to an input by finger 401 with a watercolor effect 411. In FIG. 4A it can be seen on the right hand side view that the finger 401 is near but not touching the touch sensitive device. Thus, the user may determine the function that would be executed by a particular finger input without risking entering an undesired input.

In FIG. 4B the user has retracted the index finger 401 and extended the middle finger 402. In FIG. 4B, as the middle finger 402 nears the touch screen, the finger 402 is identified and an indication 412 of a corresponding function is indicated. For example, the device may be configured to respond to an input by finger 402 with a cutout function 412. In FIG. 4B it can be seen on the right hand side view that the finger 402 is near but not touching the touch sensitive device. Thus, the user may determine the function that would be executed by a particular finger input without risking entering an undesired input.

Figure 5:
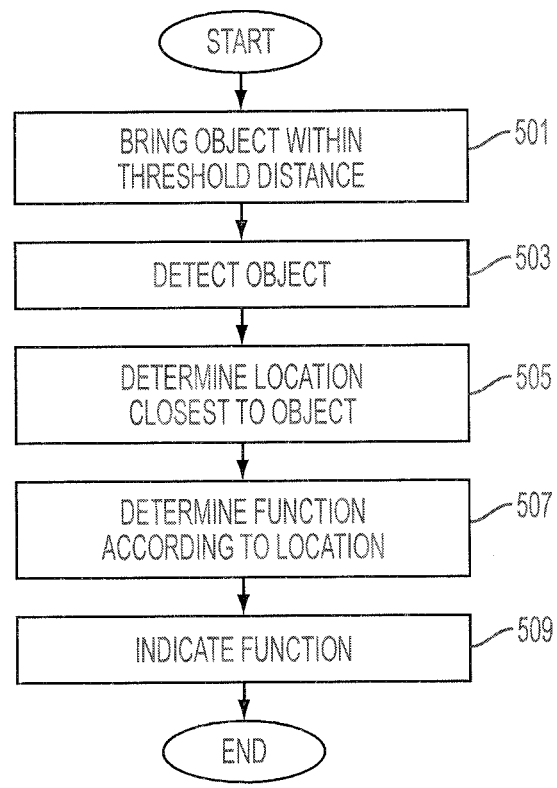
FIG. 5 is a flowchart of the method of FIGS. 4A and 4B.

FIG. 5 is a flowchart of the method of FIGS. 4A and 4B.

Referring now to FIG. 5, in operation 501 an object, for example, a finger, is brought within a threshold distance of the touch sensitive device. The touch sensitive device is able to detect at operation 503 when an object is within the threshold distance, regardless of whether the object or finger is individually identified or not.

In operation 505 the device determines a location on the touch screen closest to the detected object. That is, the device determines what point on the screen would most likely be touched if the object were close enough to touch the touch screen.

In operation 507 the device determines a function to be executed according to at least the location.

In operation 509, the device indicates the function to be executed. The indication may include any combination of audio, visual, and vibration. For example, in a graphics drawing application, the device may provide a visual indication at the location of the impending touch of the input effect. For another example, a user perusing a phone book application may hover the finger over the picture of a contact, and the application may respond by displaying that contact's name and phone number, where tapping the contact may be configured to initiate a phone call to the contact.

It is not necessary that the visual indication be localized to the location of the touch input. For example, if the user's garbage can is configured to delete objects forever without recovery, the entire screen may flash red as a warning when the impending touch would be at the garbage can.

An audio indication may be any audio sound. If the impending touch is over a volume control, for example, the indication may be a beep at the current volume level. If the impending touch is over the phone book entry, the contact's name and phone number may be read out loud by the device in conjunction with their display.

Figure 6A:
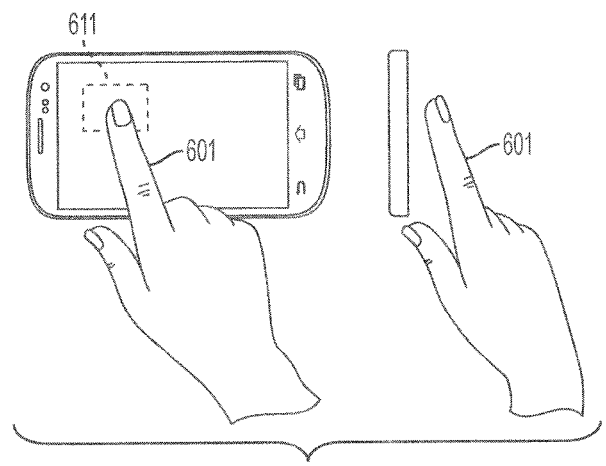
FIGS. 6A to 6C illustrate a method of indicating a function of a touch input and differentiating touch inputs according to various embodiments of the present disclosure.
Figure 6B:
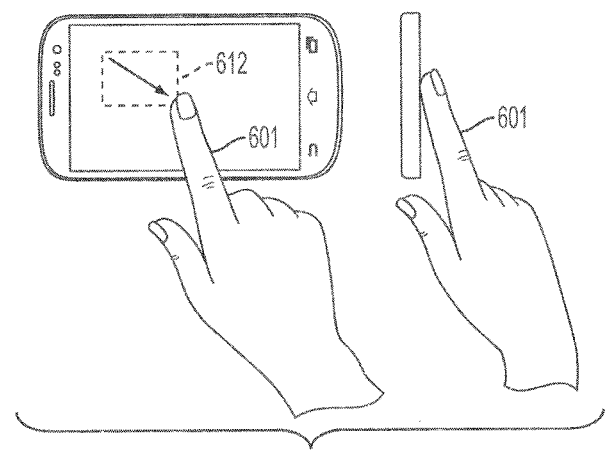
Figure 6C:
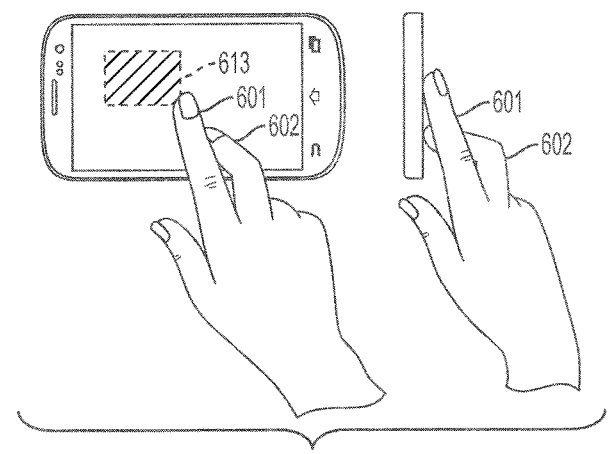

FIGS. 6A to 6C illustrate a method of indicating a function of a touch input and differentiating touch inputs according to various embodiments of the present disclosure.

Referring now to the left hand side view of FIG. 6A, the user has extended the index finger 601 to the device to determine what function would be executed. As shown in the right hand side view of FIG. 6A, the finger 601 is not touching the touch screen. The finger 601 is detected and identified. An indication 611 shows that the corresponding function is an area selection function.

In the left hand side view of FIG. 6B, the user has selected an area 612 by touch a point and then dragging the finger 601 in a right downward diagonal direction. As shown in the right hand side view of FIG. 6B, the finger 601 is in contact with the touch screen.

In the left hand side view of FIG. 6C the user touches the middle finger 602 to the touch screen to execute a different function, for example, to fill in the selected area with a solid color 613. As shown in the right hand side view of FIG. 6C, the index finger 601 and middle finger 602 are both touching the screen. The user is still touching the screen with the index finger 601, and thus may still adjust the area 612 filled in with the color 613. A different finger, for example, the ring finger, may have a completely different function associated if it touches the screen concurrently; for example, the device may be configured to save a snapshot copy of the screen when the ring finger taps.

The functions associated with an identified input may be configured by the user. For example, in the graphics drawing program, the user may hover the index finger to determine a present color and line width. If the user then touches with the middle finger, the device may be configured to execute a function of changing the color and line width that would be drawn by the index finger, according to the middle finger's input. Thus, the user may hover the index finger and "dial in" the desired effect with the middle finger without touching the screen with drawing index finger.

FIGS. 9A to 9E illustrate a method of indicating and differentiating touch inputs according to various embodiments of the present disclosure.

Figure 9A:
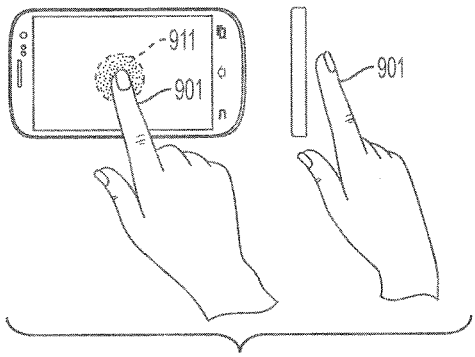
FIGS. 9A to 9E illustrate a method of indicating and differentiating touch inputs according to various embodiments of the present disclosure.

Referring now to FIG. 9A, it can be seen on the left that the user has extended a first object, for example, the first finger 901, to the device to determine what function would be executed. Let the application be a graphic drawing program, for example. An indication 911 is provided near the point of the first finger 901 to show what the graphic input would be if that finger touched the screen with a present configuration. As shown in the right hand side view of FIG. 9A, the first finger 901 is not touching the touch screen. The first finger 901 is detected and identified. An indication 911 shows that the corresponding function is a function of drawing in a particular color and width, for example.

Figure 9B:
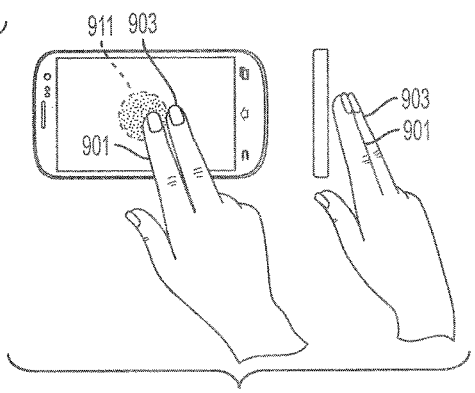

In the left hand side view of FIG. 9B, the user has extended a second object, for example, second finger 903, to within a threshold distance of the screen. As shown in the right hand side view of FIG. 9B, the fingers 901 and 903 are both seen to not be in contact with the touch screen. When the second object, for example, the second finger 903, is within the threshold distance, it is detected and an indication is provided that the second object is detected. Further, an indication may be provided of the function of the second object. Assume for this example that the function of the second finger changes a configuration of the function of the detected first finger, and that this function is indicated, for example, by a flashing or other change in the indication 911.

Figure 9C:
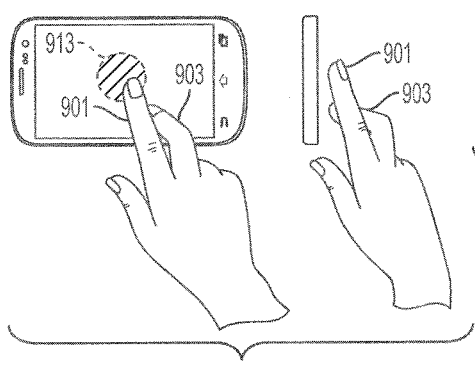
Figure 9D:
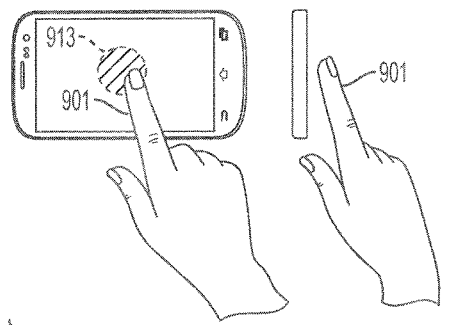

In the left hand side view of FIG. 9C the user touches rotates the second finger 903 with respect to the first finger 901. In response, the application adjusts the configuration of the function related to the first finger 901. For example, the color, width, etc., of a line drawn with the first finger 901 may be determined according to a change of the second finger 903 in relation to the first finger 901. For example, the color may be adjusted according to an amount of rotation, and a width, opacity, or other characteristic may be adjusted according to a distance between the fingers. A second indication 913 is provided to show what the input related to the first finger 901 is adjusted to. Thus, the user may "dial in" with the second finger 903 the precise function he wishes to associate with the first finger 901. As shown in the right hand side view of FIG. 9C, the first finger 901 and second finger 903 are both not touching the screen. The user may thus adjust the input without risk of touching the screen and producing an undesired input. A different object than the second finger 903, for example, a third finger, may have a completely different function associated. For example, the third finger may have a separate input function such as a fill-in function if alone, or may have a different adjustment to the function of another object such as first finger 901 if the first finger is already within the threshold distance. For example, if the second finger 903 adjusts the color and width of the input of first finger 901, a third finger might be used to adjust a brightness or an opacity of the input of first finger 903. The third finger may have a different input, for example, a text input function, if it touches the screen without the first object being within the threshold distance.

After the user is satisfied with the indicated configuration of the function of the first finger 901, he may withdraw the second finger 903 from the threshold distance. As shown in the left hand side of FIG. 9D, the second indication 913 remains as it was adjusted. The first finger 901 input will retain the new function settings until reset or readjusted. As shown in the right hand side of FIG. 9D, only the first finger 901 is within the threshold distance, and no finger is touching the screen.

Figure 9E:
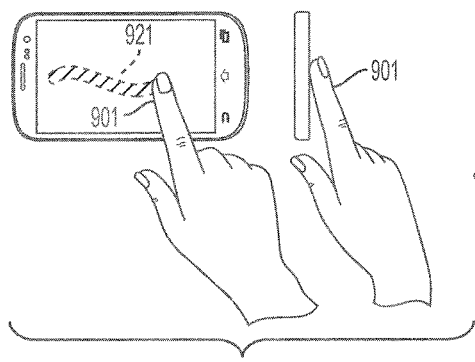

In FIG. 9E, it is shown that the user, being satisfied with the adjustment to the function of the first finger 901, touches the screen to perform that function. For example, assume the user wishes to draw a line 921 of a particular color and width. As can be seen in the right hand side of FIG. 9E, the first finger 901 is touching the screen and no other identifiable object is within the threshold distance.

Of course, the present disclosure is not limited thereto. The device may be configured such that any adjustment or configuration of a touch function of a first identified object may be adjusted or configured by a second detected and identified object within the threshold distance. The adjustment or configuration may be performed without actually touching the screen or executing the function.

Figure 10A:
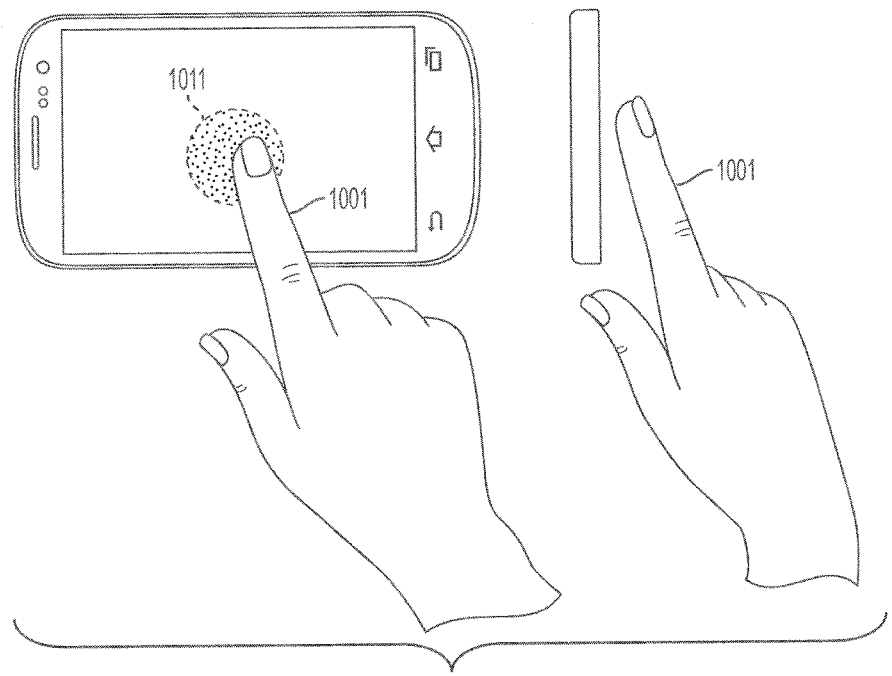
FIGS. 10A and 10B illustrate a method of indicating and differentiating touch inputs according to various embodiments of the present disclosure.
Figure 10B:
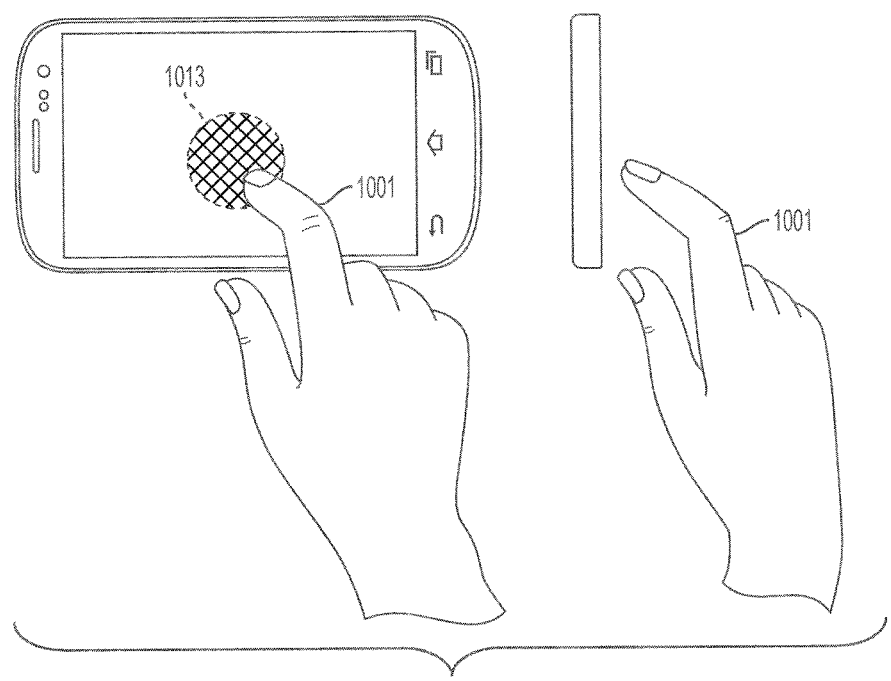

FIGS. 10A and 10B illustrate a method of indicating and differentiating touch inputs according to various embodiments of the present disclosure.

Referring now to FIG. 10A, in the left hand view a first object, for example, first finger 1001, is extended within a threshold distance of the screen. The devices detects the first finger 1001 and identifies it. In this example, it is specifically detected that the first finger 1001 is extended, that is, not bent or crooked. This may be detected, for example, but sensing contraction of muscles or tendons in the user's hand or arm, by a glove or other apparatus worn on the user's finger, or by any other appropriate means. An indication 1011 is provided of a corresponding function to the extended first finger 1001. As can be seen in the right hand view of FIG. 10A, the user's first finger 1001 is extended and within the threshold distance of the screen, but not touching.

Referring now to FIG. 10B, in the left hand view the user has determined that he wishes to use a different function associated with the first finger 1001. In this example the user bends or crooks his first finger 1001 so that it is partially extended and partially retracted. As can be seen in the right hand view of FIG. 10B, the first finger 1001 is partially bent and is within the threshold distance but is not touching the screen. A second indication 1013 is provided to indicate the function if the first finger 1001 touches the screen in the partially extended state. For example, in a graphics drawing application, the input may be a narrower darker line of a same color.

Of course, the present disclosure is not limited thereto. The device may be configured such that any adjustment or configuration of a touch function of a first identified object may be adjusted or configured by changing an orientation or other characteristic of the object. The adjustment or configuration may be performed without actually touching the screen or executing the function. It is only necessary that the adjustment or configuration be detectable. The detection can be by a sensor in the screen device; by one or more apparatus associated with the identified object, for example, a sensor on the arm, wrist, hand, finger, etc.; or by any other appropriate means.

Figure 7:
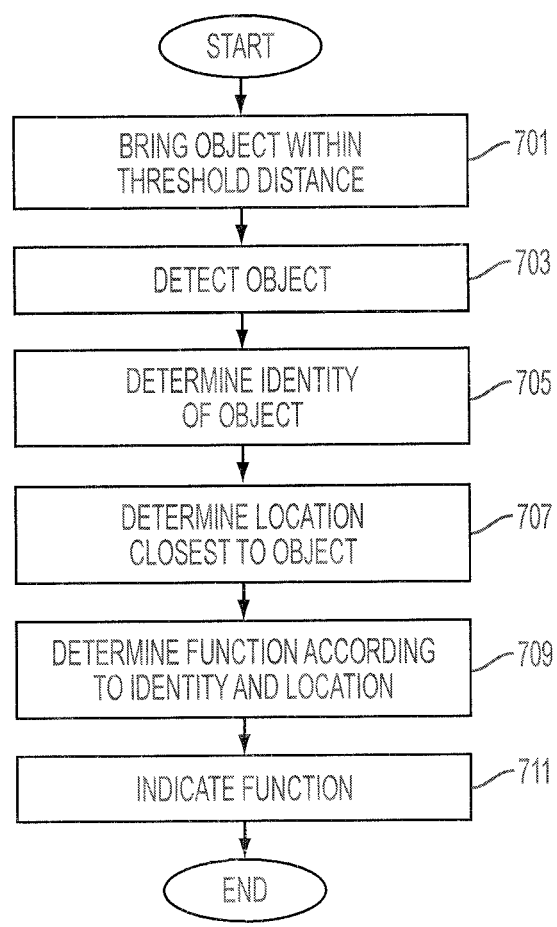
FIG. 7 illustrates a flowchart of a method according to an embodiment of the present disclosure.

FIG. 7 illustrates a flowchart of a method according to an embodiment of the present disclosure.

Referring now to FIG. 7, in operation 701 an object, for example, a finger, is brought within a threshold distance of the touch sensitive device.

In operation 703 the device detects the object. In operation 705 the device determines the identity of the object. The identity may be determined by the methods discussed above.

In operation 707 the device determines the location on the touch screen closest to the object. That is, the device determines where the object would be touching the screen, if the object were close enough to touch the screen.

In operation 709, the device determines a function to be executed according to both the identity of the object and the location of the impending touch. In operation 711 the determined function is indicated.

Figure 8:
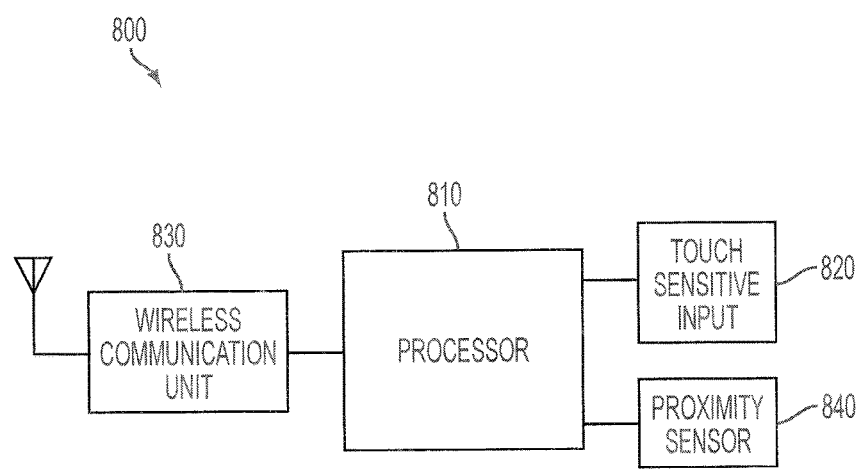
FIG. 8 illustrates a block diagram of an apparatus according to various embodiments of the present disclosure.

FIG. 8 illustrates a block diagram of an apparatus according to various embodiments of the present disclosure.

Referring now to FIG. 8, the device 800 includes at least one processor 810, a touch sensitive input 820, and a wireless communication unit 830. The device may also include a proximity sensor 840.

According to an embodiment, the wireless communication unit 830 is configured to receive an identity of an object, for example, a finger. The object identified is one of a plurality of objects. The processor 810 is configured to execute a plurality of functions. At least one function corresponds to the identity of the object. The processor 810 is further configured to execute the function according to the identity of the object when a touch is sensed on the touch sensitive input 820.

According to another embodiment, the proximity sensor 840 is configured to detect an object which is within a threshold distance of the touch sensitive input 820. The processor 810 of this embodiment is configured to determine a function to be executed according to at least a location on the touch sensitive input 820 which is closest to the detected object, and to output an indication of the determined function when the proximity sensor 840 detects that the object is within the threshold distance.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for differentiation of a touch input in a touch sensitive device, the method comprising:
    extending an object of a plurality of objects, each of the plurality of objects having a different corresponding identity;
    determining, by an external device, an identity of the extended object based on one of a detection of a contraction of muscles of a forearm or a detection of movement of tendons of a wrist;
    communicating the determined identity of the extended object from the external device to the touch sensitive device;
    when the identified extended object is within a threshold distance of the touch sensitive device, indicating, on the touch sensitive device, an editing function of an application currently executed by the touch sensitive device, the editing function corresponding to the communicated identity of the extended object without performing the editing function; and
    when the identified extended object touches the touch sensitive device, performing the editing function according to the communicated identity of the extended object.

2. The method of claim 1, wherein the plurality of objects comprises at least one finger.

3. The method of claim 2, wherein the determining of the identity of the extended object comprises identifying a device, of a plurality of devices on a respective plurality of fingers, which is within the threshold distance of the touch sensitive device.

4. The method of claim 3, wherein at least one of the plurality of devices is configured to be worn on the at least one finger between a fingertip and a hand.

5. The method of claim 3, wherein at least one of the plurality of devices comprises a form of a device attached to at least one of a fingernail or a fingertip.

6. The method of claim 2, wherein the determining of the at least one finger, which is extended, is according to a sensor device.

7. The method of claim 6, wherein the sensor device is worn on at least one of a hand, a wrist, or an arm of a user.

8. The method of claim 7, wherein the sensor device is configured to be worn on the hand of the user.

9. The method of claim 6, wherein the sensor device determines the identity of the extended finger independently of the extension of the finger.

10. The method of claim 1,
    wherein at least two of the plurality of objects have different editing functions of the touch sensitive device associated therewith, and
    wherein the associated editing functions are performed according to identities of the at least two objects when the at least two objects touch the touch sensitive device concurrently.

11. The method of claim 10,
    wherein a first object of the at least two objects has a first editing function associated therewith when the first object touches the touch sensitive device and no other object of the at least two objects concurrently touches the touch sensitive device, and
    wherein the first object has a second editing function associated therewith determined according to identities of one or more other objects that touch the touch sensitive device concurrently with the first object.

12. The method of claim 1,
    wherein the identified extended object has the editing function of the touch sensitive device associated therewith, and
    wherein the editing function is determined according to the determined identity of the extended object and an orientation of at least one of the identified extended object or the touch sensitive device.

13. The method of claim 12, wherein the editing function is determined according to a relation of the orientation of the identified extended object to the orientation of the touch sensitive device.

14. The method of claim 1,
    wherein a first object of the plurality of objects has at least two editing functions of the touch sensitive device associated therewith,
    wherein a second object of the plurality of objects has another editing function associated therewith if detected within the threshold distance of the touch sensitive device when the first object is not within the threshold distance of the touch sensitive device, and
    wherein the second object changes one of the at least two editing functions of the first object if detected within the threshold distance of the touch sensitive device when the first object is within the threshold distance of the touch sensitive device.

15. A method of indicating an editing function of a touch input of a touch sensitive device, the method comprising:
    bringing an object within a threshold distance of the touch sensitive device;
    when the object is within the threshold distance, determining, by an external device, an identity of the object based on one of a detection of a contraction of muscles of a forearm or a detection of movement of tendons of a wrist;
    determining a location on the touch sensitive device closest to the identified object;
    determining the editing function of an application currently executed by the touch sensitive device, when a touch is detected, according to at least the determined identity of the object;

when the identified object is within the threshold distance of the touch sensitive device, indicating, at the determined location on the touch sensitive device, the determined editing function of the application that corresponds to the identified object without executing the determined editing function; and when the object touches the determined location of the touch sensitive device, executing the determined editing function according to the determined identity of the object.

16. The method of claim 15, wherein the indicating of the determined editing function comprises at least one of an audible sound, a visual indication, or a vibration.

17. The method of claim 15, wherein the object comprises one of a plurality of objects.

18. The method of claim 15, wherein the determining of the editing function is further according to at least one of a configuration of the identified object, an orientation of the identified object, or an orientation of the touch sensitive device.

19. The method of claim 18, wherein, when the configuration or the orientation of the identified object changes while the identified object is within the threshold distance of the touch sensitive device, the determining and the indicating of the editing function are performed again according to the changed configuration or orientation.

20. An apparatus for differentiation of a touch input in a touch sensitive device, the apparatus comprising:
a touch sensitive input;
a wireless communicator configured to receive an identity of an object of a plurality of objects from an external device, the external device determining the identity of the object based on one of a detection of a contraction of muscles of a forearm or a detection of movement of tendons of a wrist; and
at least one processor configured to:
execute a plurality of editing functions of an application currently executed by the touch sensitive device, at least one editing function of the plurality of editing functions corresponding to the received identity of the object,
when the identified object is within a threshold distance of the touch sensitive device, indicate, on the touch sensitive device, the at least one editing function of the application that corresponds to the received identity of the object without executing the at least one editing function, and
when a touch is sensed on the touch sensitive input, execute the at least one editing function of the application according to the received identity of the object.

21. The apparatus of claim 20, wherein the identity of the object is received according to the identified object being within the threshold distance of the touch sensitive device.

22. The apparatus of claim 20, wherein the external device comprises a sensor device.

23. The apparatus of claim 22, wherein the sensor device is configured to be worn on at least one of a hand, a wrist, or an arm of a user.

24. The apparatus of claim 22, wherein the identity of the object is received only when the sensor device is paired with the apparatus prior to the apparatus receiving the identity of the object.

25. The apparatus of claim 20,
wherein at least two of the plurality of objects have different editing functions of the touch sensitive device associated therewith, and wherein the associated editing functions are performed according to identities of the at least two objects when the at least two objects touch the touch sensitive device concurrently.

26. The apparatus of claim 25,
wherein a first object of the at least two objects has a first editing function associated therewith when the first object touches the touch sensitive device and no other object of the at least two objects concurrently touches the touch sensitive device, and
wherein the first object has a second editing function associated therewith determined according to identities of one or more other objects that touch the touch sensitive device concurrently with the first object.

27. The apparatus of claim 20,
wherein the identified object has the editing function of the touch sensitive device associated therewith, and
wherein the editing function is determined according to the received identity of the object and an orientation of at least one of the identified object or the touch sensitive device.

28. The apparatus of claim 27, wherein the editing function is determined according to a relation of the orientation of the identified object to the orientation of the touch sensitive device.

29. The apparatus of claim 20,
wherein a first object of the plurality of objects has at least two editing functions of the touch sensitive device associated therewith,
wherein a second object of the plurality of objects has another editing function associated therewith if detected within the threshold distance of the touch sensitive device when the first object is not within the threshold distance of the touch sensitive device, and
wherein the second object changes one of the at least two editing functions of the first object if detected within the threshold distance of the touch sensitive device when the first object is within the threshold distance of the touch sensitive device.

30. An apparatus for indicating an editing function of a touch input of a touch sensitive device, the apparatus comprising:
a touch sensitive input;
a proximity sensor configured to detect an object which is within a threshold distance of the touch sensitive input;
a wireless communicator configured to receive an identity of the detected object from an external device, the external device determining the identity of the object based on one of a detection of a contraction of muscles of a forearm or a detection of movement of tendons of a wrist; and
at least one processor configured to:
determine the editing function of an application currently executed by the touch sensitive device, when a touch is detected, according to at least the received identity of the object,
when the proximity sensor detects that the identified object is within the threshold distance, output an indication of the determined editing function of the application on the touch sensitive device without executing the determined editing function, and
when a touch is sensed on the touch sensitive input, execute the determined editing function according to the received identity of the object.

31. The apparatus of claim 30, wherein the indication of the determined editing function comprises at least one of an audible sound, a visual indication, or a vibration.

32. The apparatus of claim 31, wherein the object comprises one of a plurality of objects.

33. The apparatus of claim 30, wherein the determination of the editing function is further according to at least one of a configuration of the identified object, an orientation of the identified object, or an orientation of the touch sensitive device.

34. The apparatus of claim 33, wherein, when the configuration or the orientation changes while the identified object is within the threshold distance of the touch sensitive device, the determining and the indicating of the editing function are performed again according to the changed configuration or orientation.

35. A method of indicating an editing function of a touch input of a touch sensitive device, the method comprising:
    bringing an object within a threshold distance of the touch sensitive device;
    detecting the object when the object is within the threshold distance;
    determining, by an external device, an identity of the detected object based on one of a detection of a contraction of muscles of a forearm or a detection of movement of tendons of a wrist;
    determining a location on the touch sensitive device closest to the detected object;
    determining the editing function of an application currently executed by the touch sensitive device, when a touch is detected, according to at least the determined location and the determined identity; and
    when the identified object is within the threshold distance, indicating, at the determined location on the touch sensitive device, the determined editing function of the application that corresponds to the determined identity of the detected object without executing the determined editing function.

36. The method of claim 35, wherein the touch sensitive device executes the determined editing function when the identified object touches the determined location.

37. The method of claim 1, wherein the determining, by the external device, the identity of the extended object is determined prior to the extended object touching the touch sensitive device.

* * * * *